US012802072B2

(12) United States Patent
Zhang et al.

(10) Patent No.: US 12,802,072 B2
(45) Date of Patent: Nov. 17, 2026

(54) TRACKING MANAGEMENT METHOD FOR COMMODITY CIRCULATION INFORMATION

(71) Applicant: COTEST (Beijing) Ltd., Beijing (CN)

(72) Inventors: Leou Zhang, Shijiazhuang City (CN); Yuyan Wang, Shijiazhuang City (CN)

(73) Assignee: COTEST (Beijing) Ltd., Beijing (CN)

( * ) Notice: Subject to any disclaimer, the term of this patent is extended or adjusted under 35 U.S.C. 154(b) by 90 days.

(21) Appl. No.: 18/461,840

(22) Filed: Sep. 6, 2023

(65) Prior Publication Data

US 2023/0410117 A1 Dec. 21, 2023

Related U.S. Application Data

(63) Continuation of application No. PCT/CN2022/087385, filed on Apr. 18, 2022.

(30) Foreign Application Priority Data

Oct. 22, 2021 (CN) ......................... 202111231473.9

(51) Int. Cl.

| | |
|---|---|
| ***G06Q 20/40*** | (2012.01) |
| ***G06Q 20/02*** | (2012.01) |
| ***G06Q 20/12*** | (2012.01) |

(52) U.S. Cl.

CPC ....... *G06Q 20/4016* (2013.01); *G06Q 20/023* (2013.01); *G06Q 20/12* (2013.01)

(58) Field of Classification Search

None

See application file for complete search history.

(56) References Cited

U.S. PATENT DOCUMENTS

| | | | | |
|---|---|---|---|---|
| 10,423,993 | B2 * | 9/2019 | Metnick | G06Q 30/0601 |
| 2016/0098723 | A1 * | 4/2016 | Feeney | G06Q 20/065 705/75 |
| 2017/0046709 | A1 * | 2/2017 | Lee | G06F 21/62 |
| 2018/0096175 | A1 * | 4/2018 | Schmeling | G06F 1/3206 |
| 2020/0045538 | A1 * | 2/2020 | Dattawadkar | H04L 9/50 |

(Continued)

FOREIGN PATENT DOCUMENTS

| | | | |
|---|---|---|---|
| CN | 101571943 | A | 11/2009 |
| CN | 102236861 | A | 11/2011 |

(Continued)

OTHER PUBLICATIONS

Supplementary European Search Report dated Mar. 13, 2024 for European Application No. EP 22882246.6.

(Continued)

*Primary Examiner* — David P Sharvin
(74) *Attorney, Agent, or Firm* — Wolf, Greenfield & Sacks, P.C.

(57) ABSTRACT

A tracking management method for commodity circulation information, relating to the field of information technology, and implemented by means of a Transaction Settlement System. By determining whether the seller of a commodity is legally holding the commodity, fake goods can be prevented from being mixed into a commodity circulation process. By means of the method, fake goods cannot enter a circulation channel, and ordinary consumers do not need to distinguish the genuine from the fake when purchasing commodities.

8 Claims, 3 Drawing Sheets

(56) References Cited

U.S. PATENT DOCUMENTS

Figure 1:
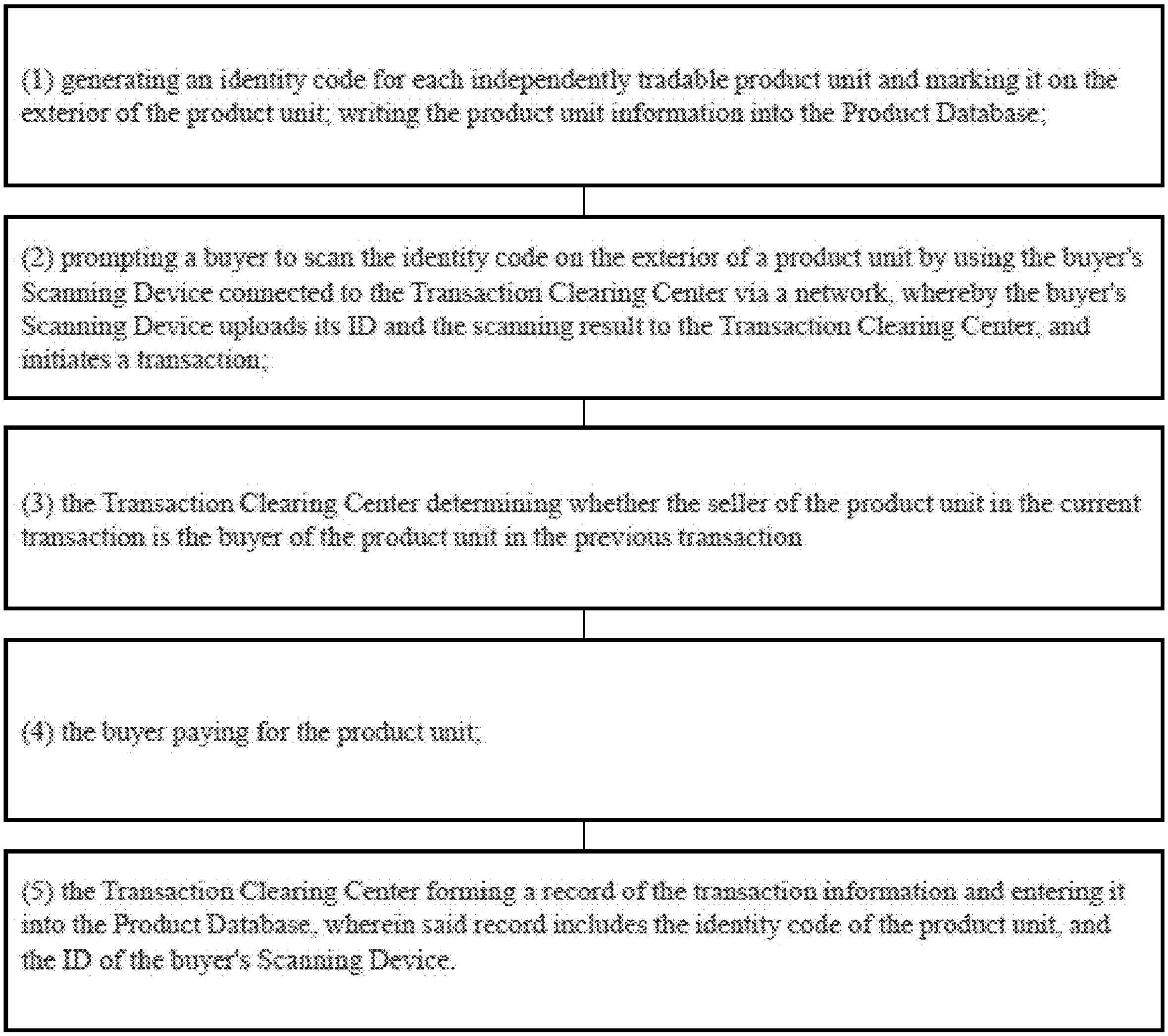

| | | | | |
|---|---|---|---|---|
| 2020/0364817 | A1* | 11/2020 | Liu | G06F 16/2379 |
| 2021/0248338 | A1 | 8/2021 | Spivack et al. | |

FOREIGN PATENT DOCUMENTS

| | | | | |
|---|---|---|---|---|
| CN | 107016552 | A | 8/2017 | |
| CN | 108764942 | A | 11/2018 | |
| CN | 110097378 | A | 8/2019 | |
| CN | 110942320 | A | 3/2020 | |
| KR | 101351352 | B1 | 1/2014 | |
| KR | 10-2021-0049388 | A | 5/2021 | |
| WO | WO 2010/100347 | A1 | 9/2010 | |
| WO | WO-2019195139 | A1 * | 10/2019 | G06Q 20/20 |

OTHER PUBLICATIONS

International Search Report and Written Opinion mailed Jun. 20, 2022 for International Application No. PCT/CN2022/087385.

* cited by examiner

TRACKING MANAGEMENT METHOD FOR COMMODITY CIRCULATION INFORMATION

This application is a continuation of international application number PCT/CN2022/087385, filed Apr. 18, 2022, which claims priority to Chinese patent application No. 202111231473.9, filed Oct. 22, 2021. The contents of these applications are incorporated herein by reference in their entirety.

FIELD OF THE INVENTION

This invention relates to the field of information technology and more particularly to a method for tracking and managing information on the transaction process of a product unit based on its identity code.

BACKGROUND OF THE INVENTION

So far, counterfeiting and anti-counterfeiting have always been in the struggle of "anti-counterfeiting is one foot higher, counterfeiting is more than one foot higher". Anti-counterfeiting methods are becoming more and more sophisticated and technically advanced, so it is more and more difficult for consumers and even for professionals to master and use such anti-counterfeiting methods to identify counterfeit products. The results of the increasingly costly fight against counterfeiting are less and less satisfactory.

A large number of cases show that counterfeiters are often insiders in the production and transaction process of authentic products, as they are usually ones who hold the wholesale and retail distribution chain from a manufacturer to consumers, and therefore have opportunities to disguise counterfeit products as authentic ones. In order to prevent the sale of counterfeits in the wholesale and retail distribution chain, there are solutions that use QR code technology combined with information technology to achieve one code for one thing, account binding and payment by scanning codes. These methods are easy for consumers to grasp and use, and have the advantage of lower cost. However, such methods can neither effectively solve the problem of counterfeiting, nor let alone fundamentally prevent the sale of counterfeits, because the QR codes marked on authentic products or their packages can be easily transferred to counterfeits or their packages by means of modern engineering techniques; worse still, an unscrupulous dealer can make a large number of QR codes containing the dealer's account number or the account number associated with the dealer as a receiving account, and mark QR codes on counterfeits or their packages, so that the money paid by a buyer by scanning a QR code will automatically enter the dealer's own or associated account, thus selling counterfeits in large quantities unhindered and even easier.

The most sophisticated anti-counterfeiting methods, as long as they require a cooperation of buyers, especially a difficult cooperation, are likely to be very disappointing. The best way to combat counterfeiting is therefore to keep counterfeits off the market (in this invention, the "market" doesn't have geographical boundaries, but refers to trading activities in general) without buyers having to identify them.

SUMMARY OF THE INVENTION

It is an object of the present invention to simply and effectively prevent counterfeits from mixing into the transaction process of authentic products, so that a buyer can easily buy an authentic product without having to identify the authenticity.

In accordance with an embodiment of the invention there is provided a Tracking Management Method for Commodity Circulation Information, implemented by means of a Transaction Settlement System having a Product Database, Scanning Devices, and a Transaction Clearing Center, comprising the steps of:

(1) generating an identity code for each independently tradable product unit and marking it on the exterior of the product unit; writing the product unit information into the Product Database;

(2) prompting a buyer to scan the identity code on the exterior of a product unit by using the buyer's Scanning Device connected to the Transaction Clearing Center via a network, whereby the buyer's Scanning Device uploads its ID and the scanning result to the Transaction Clearing Center, and initiates a transaction;

(3) the Transaction Clearing Center determining whether the seller of the product unit in the current transaction is the buyer of the product unit in the previous transaction, and upon a positive determination executing step (4); otherwise, terminating the initiated transaction;

(4) the buyer paying for the product unit;

(5) the Transaction Clearing Center forming a record of the transaction information and entering it into the Product Database, wherein said record includes the identity code of the product unit, and the ID of the buyer's Scanning Device.

Further, the Transaction Settlement System also includes a Settlement Account dedicated by a manufacturer to receive and transfer payments for all transactions of the manufacturer's product units, and a Transaction Settlement Software. In step (4), the buyer pays the amount payable for the transaction to the Settlement Account of the manufacturer, whereafter the paid amount is transferred by the Transaction Settlement Software to the seller of the product unit in the current transaction.

Further, each independently tradable product unit said in step (1) corresponds to an individual identity code, and the identity code of every independently tradable product unit is generated and marked on the exterior of the product unit before the product unit is shipped into trading transaction.

Further, step (3) comprises the sub-steps of:

① the Transaction Clearing Center reading the most recent transaction record of the product unit with the identity code in the initiating transaction information from the Product Database, and sending an authentication message to the Scanning Device of the buyer in the most recent transaction record; and ② with the help of the current buyer using its Scanning Device to scan the authentication message sent to the previous buyer and to upload the scanning result to the Transaction Clearing Center, determining whether the seller in the current transaction has received the authentication message, and whereafter determining the current seller as the previous buyer and therefore as justified to sell the product unit if the Transaction Clearing Center receives the scanning result for the authentication message from the buyer having initiated the transaction; and otherwise terminating the initiated transaction.

Said authentication message may be a QR code, including the current time information.

Or step (3) comprises the sub-steps of:

① the seller scanning the identity code on the exterior of the product unit using its Scanning Device, and uploading the ID of the Scanning Device and the scanning result to the Transaction Clearing Center to supplement the transaction information; and ② the Transaction Clearing Center reading the last transaction record of the product unit with the identity code in the supplementary transaction information from the Product Database, and determining the current seller as the previous buyer and therefore as justified to sell the product unit if the ID of the Scanning Device in the supplementary transaction information is the same as the ID of the Scanning Device of the buyer in the most recent transaction record of the product unit; and otherwise terminating the transaction.

Further, the Transaction Settlement System comprises a Dealer Database including all dealers authorized or registered by the manufacturer as being qualified to sell all or part of the manufacturer's products and their Scanning Device IDs; and step (3) further comprises determining the buyer of the product unit in the previous transaction as a dealer authorized or registered by the manufacturer as being qualified to sell the product unit if the Transaction Clearing Center finds in the Dealer Database the ID of the Scanning Device of the buyer recorded in the most recent transaction record of the product unit in the initiating transaction information; and otherwise terminating the initiated transaction.

When a product unit is shipped from the factory, it can be recognized as authentic. Any product unit may pass through several dealers until it reaches a final consumer, and counterfeits are most likely to appear during this transaction process.

By identifying whether the seller of a product unit in each transaction is the previous buyer in the transaction process of the product unit, the invention verifies whether every seller is qualified to sell and prevents the mixing of counterfeit products. This results in beneficial effects: 1. The manufacturer assigns an identity code to every product unit and enters it into the Product Database, and the subsequent transactions are completed based on the Product Database, ensuring that no counterfeits can enter the transaction process of the authentic products, so that every buyer can easily buy authentic products without having to identify their authenticity; 2. Starting from the manufacturer, the distribution channels of every product unit are recorded to ensure that each seller is the previous buyer of the product unit during the transaction process from the factory to the final consumer; 3. Once a seller has sold a product unit, it is impossible to sell another unit with the same identity code, thus preventing the seller from selling counterfeits while selling authentic products; 4. Using the Settlement Account dedicated by the manufacturer to receive and transfer payments for all transactions of the manufacturer's product units, every buyer inter alia consumer deals directly with the manufacturer to prevent fraudulent practices, while the manufacturer can monitor the sales path and price changes of the product units it produces.

DETAILED DESCRIPTION

The present invention is further specified below by means of embodiments.

A Tracking Management Method for Commodity Circulation Information is implemented by means of a Transaction Settlement System comprising a Product Database, Scanning Devices, and a Transaction Clearing Center.

The Transaction Settlement System also includes a Settlement Account dedicated by a manufacturer to receive and transfer payments for all transactions of the manufacturer's product units, and a Transaction Settlement Software. In the present invention, each manufacturer sets up a Settlement Account for its products and uses this special account to complete all transactions of its products through a Transaction Settlement Software.

The Transaction Settlement System also comprises a Dealer Database including all dealers authorized or registered by a manufacturer as being qualified to sell all or part of the manufacturer's products and their Scanning Device IDs. In the present invention, the Transaction Clearing Center determines whether a seller is a qualified dealer by attributing its Scanning Device ID. The Scanning Device may be a mobile phone, a special scanner, etc. The Scanning Device needs to have the ability to connect to the internet.

Each dealer can have more than one Scanning Device, and the ID of each Scanning Device is associated with the dealer in the Dealer Database and can be added or deleted.

Said method includes the steps of:

(1) generating an identity code for each independently tradable product unit and marking it on the exterior of the product unit; writing the product unit information into the Product Database.

Figure 2:
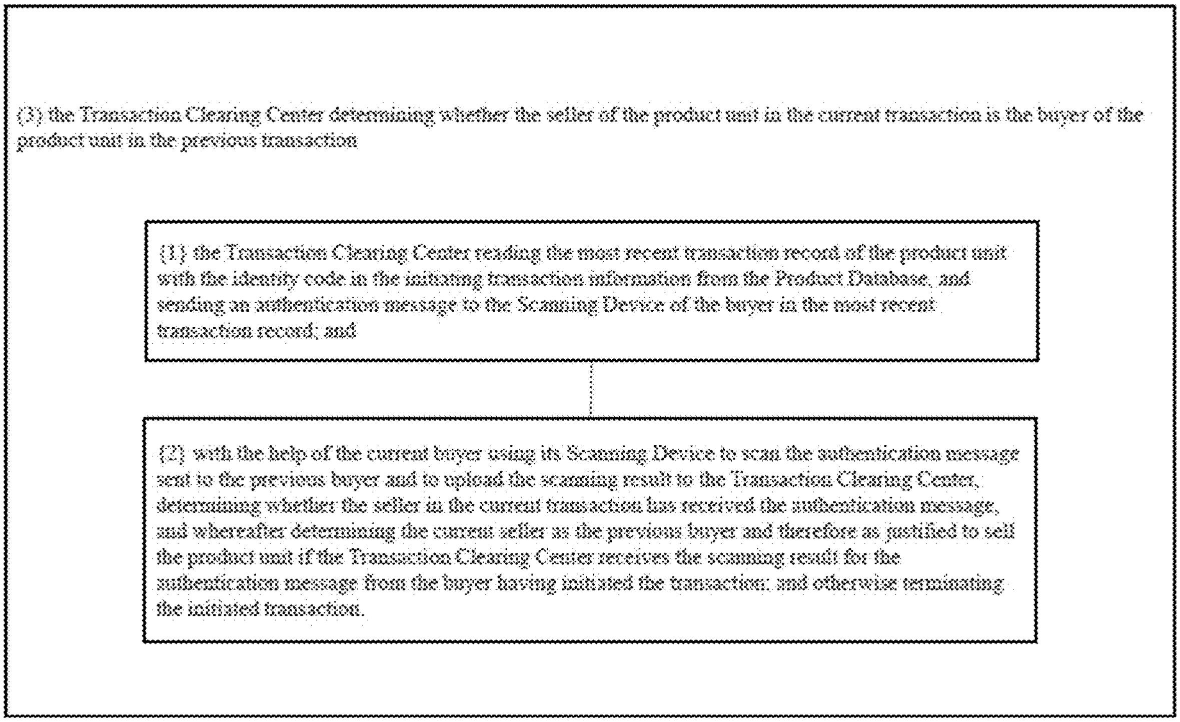
Figure 3:
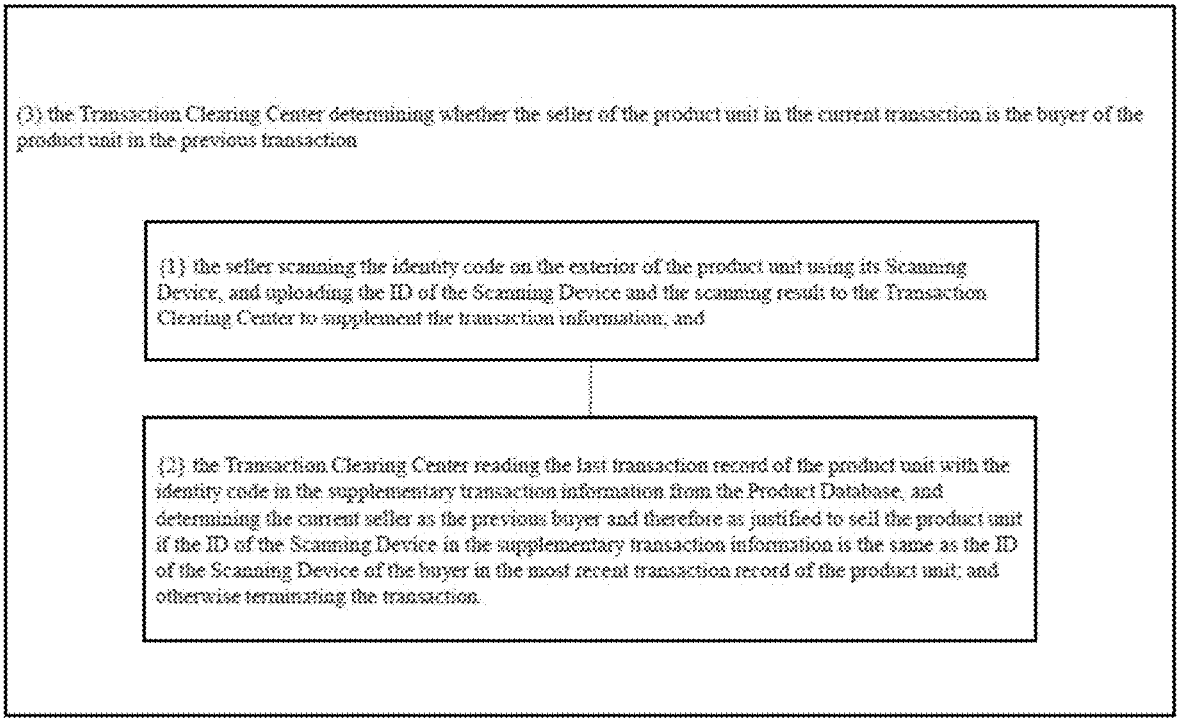

FIG. 1 is a figure of a Tracking Management Method for Commodity Circulation Information, implemented by means of a Tracking Settlement System having a Product Database, Scanning Devices, and a Transaction Clearing Center, in accordance with an embodiment;

FIG. 2 is a figure of sub-steps of the Transaction Clearing Center determining whether the seller of the product unit in the current transaction is the buyer of the product unit in the previous transaction; and FIG. 3 is a figure of alternative or additional sub-steps of the Transaction Clearing Center determining whether the seller of the product unit in the current transaction is the buyer of the product unit in the previous transaction.

Said identity code may be a barcode, QR code or RFID, or other types of encoding may be used. Hereinafter, QR code is used as an example to represent the identity code.

Each independently tradable product unit corresponds to its individual identity code, the identity code of every independently tradable product unit is generated, and the QR code generated from the identity code is marked on the exterior of the product unit before the product unit leaves the factory for trading.

Any product may be traded in a specific quantity and packaging, whether it is the smallest single product or a collection of products in different quantities, as long as it can be traded as stand-alone units, it is referred to as an "independently tradable product unit" or simply as a "product unit". In accordance with predetermined rules, a coding machine assigned an individual identity code to each product before it is put into a warehouse of finished products, and the QR code generated from the identity code is marked on the product for scanning; as the product is sealed piece by piece, a certain number of the product is assembled in a box and a number of the box of the product is assembled into a larger unit, whereby a corresponding individual identity code is assigned to each package, box and unit, and the QR code generated from the identity code is marked on the exterior of the package, box, unit for scanning. That means, an individual identity code is assigned to every product unit, and the QR code generated from the identity code is marked on the exterior of the product unit for scanning.

Under the identity code of each product unit, the Product Database not only records the static characteristics of the product unit before it leaves the factory and enters into the transaction process, including the name, trademark, specification, manufacturer, batch, serial number, technical parameters, quality, quantity, packaging form, inventory location, as well as the identity code of the larger product unit to which the product unit directly belongs and the identity codes of the smaller product units directly included. The Product Database also records the dynamic transaction information generated by each transaction for every product unit, including the authentication information generated for each transaction, as well as the unit price, quantity and total amount of the product traded, the time, place and method of the transaction (e.g. online or offline, pick-up or delivery), and the seller's, the buyer's and any associated third party's name, ID, Settlement Account number, Scanning Device's ID (e.g. mobile phone number) and location, and the number of times the identity code of the product unit has been scanned, whereby the buyer in the $n^{th}$ transaction is the seller in the $(n+1)^{th}$ transaction; for every product unit that is directly traded with the manufacturer and will exit the factory, the seller in the first transaction is the manufacturer; for every product unit that is split from a larger-size product unit and traded for the first time, the seller in the first transaction is the buyer in the last transaction before the split of the larger-size product unit to which it is directly subordinate.

(2) A buyer scans the identity code on the exterior of a product unit by using the buyer's Scanning Device connected to the Transaction Clearing Center via a network, whereby the buyer's Scanning Device uploads its ID and the scanning result to the Transaction Clearing Center, and initiates a transaction.

In the present invention, a transaction is initiated by a buyer, and the determination of the legality of the transaction and the transfer of the payment are completed at the Transaction Clearing Center.

The Transaction Clearing Center determines whether the seller in the current transaction is the buyer in the previous transaction. If so, step (4) is executed; otherwise, the initiated transaction is terminated.

In regulated distribution channels, the manufacturer of a product unit is the seller in the first transaction, or the buyer in the previous transaction is the seller in the current transaction. One of the essentials of the present invention is to ensure that products circulate in regulated distribution channels, which can only sell authentic products. This is achieved by determining whether the seller in the current transaction has the right to sell, i.e. by determining whether the seller in the current transaction of a product unit is the buyer in the previous transaction of the same product unit.

Each manufacturer is the seller in the first transaction. In step (1), every manufacturer is set as the seller in the first transaction.

There are various methods to determine whether the seller in the current transaction is the buyer in the previous transaction. For example, the Transaction Clearing Center can read the most recent transaction record of the product unit with the identity code in the initiating transaction information from the Product Database, and send the name of the buyer in the recorded information of the most recent transaction to the buyer in the initiated transaction for determining. However, this method requires the buyer to make an additional determination and is not friendly enough.

In accordance with an embodiment of the invention there are provided two methods for determining whether the seller in the current transaction is the buyer in the previous transaction.

Method 1:

① from the Product Database, the Transaction Clearing Center reads the most recent transaction record of the product unit with the identity code in the initiating transaction information, and sends an authentication message to the Scanning Device of the buyer in the most recent transaction record; and ② whether the seller in the initiated transaction has received the authentication message sent by the Transaction Clearing Center to the Scanning Device of the last buyer of the product unit is confirmed by the buyer who has initiated the transaction and then uses its Scanning Device to scan the authentication message on the Scanning Device of its counterpart and upload the scanning result to the Transaction Clearing Center. If the Transaction Clearing Center receives the scanning result for the authentication message from the buyer having initiated the transaction, it will be determined that the seller in the initiated transaction is the buyer of the product unit in the previous transaction and has the right to sell; otherwise, the initiated transaction is terminated.

Said authentication message may be a QR code, including the current time information.

Method 2:

① the seller scans the identity code on the exterior of the product unit using its Scanning Device, uploads the ID of the Scanning Device and the scanning result to the Transaction Clearing Center to supplement the transaction information; and ② from the Product Database, the Transaction Clearing Center reads the most recent transaction record of the product unit with the identity code in the supplementary transaction information, and determines that the current seller is the previous buyer and therefore justified to sell the product unit if the ID of the Scanning Device in the supplementary transaction information is the same as the ID of the Scanning Device of the buyer in the most recent transaction record of the product unit; and otherwise, the transaction is terminated.

In the present invention, the seller in a transaction is also judged as follows: in step (3), the Transaction Clearing Center reads the most recent transaction record of the product unit with the identity code in the initiating transaction information from the Product Database, and determines the buyer in the most recent transaction as a dealer authorized or registered by the manufacturer as being qualified to sell the product unit if the ID of the Scanning Device of the buyer recorded in the most recent transaction record of the product unit is found in the Dealer Database; otherwise, the transaction is terminated.

When the seller has met the above requirements, step (4), i.e. paying for the product unit by the buyer, is performed: the Transaction Clearing Center assists the seller in generating a transaction statement to be submitted to the buyer, and after the buyer's confirmation, the amount payable by the buyer is firstly paid to the Settlement Account dedicated by the manufacturer to receive and transfer payments for all transactions, and then the Transaction Clearing Center executes the Transaction Settlement Software to transfer the amount to the seller and the parties associated with the transaction in accordance with the transaction statement.

The parties associated with the transaction are the third parties who facilitate the transaction or deliver the product unit or collect taxes or so some things necessary.

When the transaction process encounters the deception of phishing, the buyer is protected from deception by means of the uniqueness of the Settlement Account number dedicated by the manufacturer to receive and transfer payment for all transactions and by means of stringent controlling measures for the manufacturer's Settlement Account number.

After the transaction is completed, step (5) is executed: the Transaction Clearing Center forms a record of the information of the transaction and enters the record into the Product Database; said record includes the QR code of the product unit, the unit price, the quantity, the total amount, the time, the place and the manner of the transaction, as well as the names of both parties of the transaction, their Settlement Account numbers, the ID of the buyer's Scanning Device and its location.

In order to better describe the present invention, especially to better illustrate the beneficial effects of the invention, the following specific embodiments of the invention are described in detail using Moutai Liquor as an example, which is only used to describe the invention and does not limit the application scope of the invention.

Guizhou Moutai Liquor Company Limited (hereinafter referred to as "Moutai Company") establishes, maintains and operates an individual Transaction Settlement System in an independent market (a country or region with entry/exit controls) for all or some of the products it produces (such as Guizhou Moutai Liquor Flying Sky 500 ml in cardboard packaging, hereinafter referred to as "Moutai Liquor"), either by itself or by entrusting a third party. The Transaction Settlement System has a Product Database, a Dealer Database, Scanning Devices, a Transaction Clearing Center, a Settlement Account dedicated by Moutai Company to receive and transfer payments for all transactions of its product units, and a Transaction Settlement Software, in order to intercept counterfeit liquor from the market by tracking and managing information on the transaction process of Moutai Liquor, so that a buyer does not need to distinguish the authentic from the counterfeit when purchasing Moutai Liquor. The specific steps are as follows:

Step (1): generating and marking an identity code for each independently tradable product unit and writing the product unit information into the Product Database:

before Moutai Liquor leaves the factory for trading, Moutai Company generates an individual identity code for each bottle of Moutai Liquor in accordance with predetermined rules, and the QR code generated from the identity code is marked on the bottle for scanning; if the bottle is packaged separately, an identity code is assigned to the package, and the QR code generated from the identity code of the package is marked on the exterior of the package for scanning; if some packaged bottles are packaged again into a box (e.g. six-pack), an identity code is assigned to the box, and the QR code generated from the identity code of the box is marked on the exterior of the box for scanning; by analogy, a collection of boxes, packages and bottles of Moutai Liquor, as long as they are traded as an independent unit, gets an individual identity code in the market, and the QR code generated from this identity code is marked on the exterior of this unit for scanning; and the Product Database not only records the identity code of each product unit and its static characteristics before it leaves the factory and enters into the transaction process, including the name, trademark, specification, manufacturer, batch, serial number, technical parameters, quality, quantity, packaging form, inventory location, as well as the identity code of the larger product unit to which the product unit directly belongs and the identity codes of the smaller product units directly included; the outcome of this is such as the one-to-one correspondence relationship between the identity code of each package and the identity code of the bottle it packs, and the inclusion/subordination relationship between the identity code of each box and the identity codes of several packages it contains; the Product Database also records the dynamic transaction information generated by each transaction of every product unit, including the authentication information sent by the Transaction Clearing Center for each transaction, as well as the unit price, quantity and total amount of the product traded, the time, place and method of the transaction, and the seller's, the buyer's and any associated third party's name, ID, Settlement Account number, Scanning Device's ID (e.g. mobile phone number) and location.

Steps (2) and (3): after a buyer scans the QR code on the exterior of a product unit to initiate a transaction, the Transaction Clearing Center determines whether the seller has the right to sell.

After the Scanning Device of any ID scans the QR code on the exterior of any product unit, a communication connection is established with the Transaction Clearing Center, and the following scenarios occur:

Scenario 1: the ID of the Scanning Device is owned by the buyer in the last independent transaction of the product unit or in the last transaction of a larger size unit to which this product unit directly or indirectly belongs (also referred to as "linked transaction"), but the last buyer is not in the Dealer Database. In this scenario, the Transaction Clearing Center sends a prompt such as "you are not eligible to sell the product" to the last buyer; if the last buyer responds then with feedback such as "return", the Transaction Clearing Center sends a prompt such as "please return the product directly to the manufacturer" to the last buyer; anyway, the transaction is terminated and the Transaction Clearing Center records the attempted transaction in the Product Database.

Scenario 2: the ID of the Scanning Device is owned by the buyer in the last independent or linked transaction of the product unit, and the last buyer is in the Dealer Database. In this scenario, the Transaction Clearing Center sends a prompt like "if you want to sell the product unit, please ask the buyer to scan the QR code on the exterior of the product unit" to the last buyer; the transaction is then temporarily suspended until the buyer in the current transaction scans the QR code on the exterior of the product unit to be traded.

Scenario 3: the ID of the Scanning Device is not owned by the buyer in the last independent or linked transaction of the product unit. In this scenario, the Transaction Clearing Center takes the code scanning action as a purchase intention by default, therefore firstly looks for the Scanning Device ID of the last buyer in the Dealer Database; if it is not found, the Transaction Clearing Center then sends a message such as "the holder of the product is not eligible to sell" to the device that scanned the QR code of the product unit; anyway, the transaction is terminated and the Transaction Clearing Center records the attempted transaction in the Product Database, and the person who scanned the QR code of the unit can upload counterfeiting clues under the guidance of the Transaction Clearing Center.

Scenario 4: in scenario 3 above, if the Scanning Device ID of the last buyer of the product unit is found in the Dealer Database, the last buyer is a dealer authorized or registered by the manufacturer as being qualified to sell the product unit. In this scenario, the Transaction Clearing Center sends an authentication message to the Scanning Device of the last buyer and a prompt such as “if you want to sell the product, please let the buyer scan this authentication message”, and at the same time a prompt such as “if you want to buy the product, please scan the authentication message on the seller’s terminal device” to the current buyer’s Scanning Device (that scanned the QR code of the product unit); if, within a certain length of time, the Transaction Clearing Center does not receive the result of the scanning of the authentication message from the current buyer, the seller in the current transaction may not be the buyer of the product unit in the last transaction and is suspected of selling counterfeits, so that the current transaction is terminated and the Transaction Clearing Center records the attempted transaction in the Product Database and the Dealer Database, and the person who scanned the QR code of the unit can upload counterfeiting clues under the guidance of the Transaction Clearing Center.

Scenario 5: in scenario 4 above, if the Transaction Clearing Center receives the result of the scanning of the authentication message from the current buyer, the seller in the current transaction is the buyer in the last transaction of the product unit and has the right to sell. In this scenario and only in this scenario, the Transaction Clearing Center starts the payment procedure in order to complete the transaction.

It is worth mentioning that the Dealer Database records and updates at any time the information of all authorized or registered dealers who are qualified to sell all or part of products of Moutai Company, including key information reflecting their identity, business and strength such as name, ID, residence, business scope, website, legal representative, registered capital, paid-in capital, Settlement Account, ID of Scanning Devices. A buyer in a transaction who is not yet qualified to resell can apply for sales qualification at the same time as or around the time of buying Moutai Liquor. The Transaction Clearing Center will review the application in real time and immediately authorize or register qualified applicants, and inform those who are not qualified of the conditions they lack. Furthermore, the Transaction Clearing Center will promptly cancel the sales qualification of dealers who no longer meet the pre-established authorization or registration conditions or who give up their sales qualification on their own.

It should be noted that in order to enhance the privacy and security of transactions, the authentication message sent by the Transaction Clearing Center to the last buyer of a product unit can be set to expire once scanned or after a certain period of time, or can be limited to scanning with the Scanning Device used by the current buyer to scan the QR code of the product unit. When scanning with other devices, the Transaction Clearing Center will report an error and alert the current buyer.

It is important to emphasize that the method proposed by the invention does not prevent the sale of authentic products as usual, even if some special circumstances authentic products are in make the Transaction Clearing Center temporarily unable to confirm the seller’s right to sell, such as: ① the ID of the Scanning Device used by the seller does not match the ID the seller used to buy in the previous transaction or is not among the seller’s Scanning Device IDs stored in the Dealer Database, in this circumstance, the seller only needs to go through a transaction procedure, whereafter the ID of the Scanning Device the seller used to buy is stored as the new ID of the seller’s Scanning Device, and the payment is returned immediately; ② the ID of the Scanning Device the seller used to buy in the previous transaction is no longer in use and no IDs of other Scanning Devices are stored in the Dealer Database under the seller’s name, in this circumstance, the seller needs to use the ID of the Scanning Device the seller used to buy in the previous transaction, or the email address, name and ID, etc., which are individual for the seller and kept in the Transaction Clearing Center, to update the Scanning Device ID, and at the same time can choose to update the identity information together.

Steps (4) and (5): the amount payable for the transaction is received and transferred instantly through the Settlement Account dedicated by the manufacturer to receive and transfer payments for all transactions of the manufacturer’s product units, and the transaction information is entered into the Product Database at the same time:

For example, a distributor bought a batch of Moutai Liquor (say 100 boxes) from Moutai Company. After this product unit as a whole has been traded through several levels of wholesale, Distributor X split it into smaller units for sale. After the QR code of each of the 5 packages of them is scanned by Consumer A online using his mobile phone or other Scanning Device, the Transaction Clearing Center sends an authentication message and a prompt such as “if you want to sell the 5 packages of Moutai Liquor, please let the buyer scan this authentication message” to the Scanning Device of Distributor X, because Distributor X is the buyer of the 5 packages of Moutai Liquor in their last linked transaction and in the Dealer Database. At the same time, the Transaction Clearing Center sends a prompt such as “if you want to buy the 5 packages of Moutai Liquor, please scan the authentication message on the seller’s terminal device” to the Scanning Device of Consumer A. After Consumer A uses his Scanning Device to scan the authentication message received by Distributor X’s terminal device and uploads the ID of the Scanning Device and the scanning result to the Transaction Clearing Center, the Transaction Clearing Center then determines that the seller of this current transaction, Distributor X, is the buyer of the unit (the 5 packages of Moutai Liquor) in the last (linked) transaction and sends a payment page to Distributor X’s terminal device. After Distributor X confirms and/or enters the quantity, price (e.g. CNY 1,000 per package of Moutai Liquor, 5 packages totaling CNY 5,000) and the name, the Settlement Account and the delivery fee (e.g. CNY 100) of the delivery party on the payment page, the Transaction Clearing Center then sends a transaction statement including the name and the Settlement Account of Moutai Company as well as the above transaction information to the Scanning Device of Consumer A for confirmation. After Consumer A clicks on the confirmation, the payment of CNY 5,000 is first credited to the Settlement Account of Moutai Company, of which CNY 4,900 is then transferred by the Transaction Settlement Software to the Settlement Account of Distributor X and CNY 100 to the delivery party’s Settlement Account. At the same time, the Transaction Clearing Center forms the information of this transaction into a record and enters it into the Product Database.

Retail Store B bought 5 boxes of Moutai Liquor from Distributor X and sold 1 box of them to Restaurant C. Restaurant C offered 1 bottle of the box to Customer D to drink with some guests, and since Restaurant C is sold out of Moutai Liquor, Customer D bought another bottle from Retail Store B and brought it into Restaurant C to drink. After Customer D scans the QR code of the package or bottle of Moutai Liquor, the Transaction Clearing Center sends an authentication message and a prompt such as "if you want to sell the package/bottle of Moutai Liquor, please let the buyer scan the authentication message" to the Scanning Device of Restaurant C, because Restaurant C is the buyer of this package/bottle of Moutai Liquor in the last linked transaction and in the Dealer Database. At the same time, the Transaction Clearing Center sends a prompt such as "if you want to buy the package/bottle of Moutai Liquor, please scan the authentication message on the seller's terminal device" to the Scanning Device of Customer D. After Customer D uses his Scanning Device to scan the authentication message received by Restaurant C's terminal device and uploads the ID of the Scanning Device and the scanning result to the Transaction Clearing Center, the Transaction Clearing Center then determines that the seller of this current transaction, Restaurant C, is the buyer of the unit (this package/bottle of Moutai Liquor) in the last (linked) transaction and sends a payment page to Restaurant C's terminal device. After Restaurant C confirms and/or enters the quantity, price (e.g., CNY 1,300 for the bottle of Moutai Liquor) and the price of the meal consumed together with CNY 1,000 (or when buying another bottle CNY 1,000 for other goods bought together in Retail Store B) on the payment page, the Transaction Clearing Center then sends a transaction statement including the name and the Settlement Account of Moutai Company as well as the above transaction information to the Scanning Device of Customer D for confirmation. After Customer D clicks on the confirmation, the payment of CNY 2,300 is first credited to the Settlement Account of Moutai Company, the Transaction Settlement Software then transfers the amount to the Settlement Account of Restaurant C (or when buying another bottle to the Settlement Account of Retail Store B). At the same time, the Transaction Clearing Center forms the information of this transaction into a record and enters it into the Product Database.

It is worth mentioning that the Settlement Account held under the name of "Moutai Company" and dedicated to receiving and transferring payment for transactions has to be approved and registered by financial regulatory authorities and opened by payment and settlement systems such as banks, UnionPay, WeChat Pay or other online payment or credit card providers. Therefore, the Settlement Account is legal and individual and not controlled by distributors, so counterfeiting can be ruled out. The transferring of all payments through the Settlement Account of Moutai Company makes buyers believe that the Moutai Liquor they buy is authentic. This is especially important in the current market environment where counterfeit Moutai Liquor is prevalent, in order to eliminate consumer concerns and improve the market environment.

Effect 1: counterfeit products with stolen, copied or acquired identity codes of authentic products marked for sale on the exterior of counterfeits are intercepted from the market:

After Customer D has consumed the two bottles of Moutai Liquor at Restaurant C, the bottles and their packages are left at Restaurant C. If Restaurant C fills non-Moutai liquor into a discarded or replicated bottle and packs it in a discarded or replicated package, after Customer E uses his mobile phone to scan the QR code on the exterior of the package or bottle, the Transaction Clearing Center sends Customer E a message such as "the holder of the product is not eligible to sell", because the buyer in the last transaction of the package or bottle of Moutai liquor, Customer D, has no selling rights as he is not in the Dealer Database. At the same time as terminating the transaction, the Transaction Clearing Center records the attempted transaction in the Product Database, and Customer E can upload counterfeiting clues under the guidance of the Transaction Clearing Center.

Let's suppose that Customer D wants to return the finished bottle and its package to Restaurant C as a return, so that Restaurant C can use the Moutai bottle to fill the non-Moutai liquor and pack it in the original package for further sale. When Customer D or Restaurant C scans the QR code on the exterior of the bottle or its package, the Transaction Clearing Center sends a message such as "the holder of the product is not eligible to sell" to Customer D or Restaurant C. If Customer D or Restaurant C then responds with feedback such as "return", the Transaction Clearing Center sends Customer D or Restaurant C a prompt such as "please return the product directly to the manufacturer". In any case, the transaction is terminated and the Transaction Clearing Center records the attempted transaction in the Product Database.

It follows that any consumer (broadly defined as a natural person who buys products for his or her own consumption or a legal person whose business is not selling such products) is not qualified to sell Moutai Liquor (that is consistent with commercial rules and customs) and therefore cannot not only sell counterfeits themselves, but also cannot sell the discarded identity codes and/or packages of authentic products to counterfeiters. Even if a counterfeiter steals or copies the identity code of an authentic product and marks it on the exterior of a counterfeit, the counterfeit is intercepted because the buyer of the authentic product is a consumer and therefore not qualified to sell it.

If the sale of Moutai Liquor is not limited to authorized or registered dealers, the Transaction Clearing Center can set a unit price range to intercept consumers from cooperating with counterfeiters to sell a counterfeit by using the identity code of an authentic product. For example, the price of Moutai Liquor is controlled at CNY 1000 to 1300 per bottle. If the bottle price of the payment is within this range, the Transaction Settlement System will release the payment operation, otherwise the payment will be interrupted, the price range will be prompted, and modifying of the bottle price and repaying are allowed. This means that Restaurant C has to pay at least CNY 1,000 for a single transaction to buy each empty bottle and its package after Customer D and the guests finish drinking the two bottles of Moutai Liquor at Restaurant C, and Customer D appears to be selling Moutai Liquor at a bottle price that is CNY 300 less than the purchase price, which makes the Transaction Clearing Center to become suspicious and record it in the Product Database.

Effect 2: at most, a dealer exchanges an authentic product for a counterfeit, on the exterior of which the identity code of the authentic product is affixed, while at the same time the authentic product becomes a "counterfeit":

Let's suppose that after Distributor X opened a box of Moutai Liquor and sold 5 bottle/packages of it to Consumer A, Distributor X bottled non-Moutai liquor, packed 5 bottle/packages of counterfeit Moutai liquor in the original box, and sealed the box intact for sale. After a buyer scans the QR code on the exterior of the box, the Transaction Clearing Center finds that the QR code corresponds to a product unit that can no longer be traded as a whole due to splitting. Because re-scanning the QR code is suspected of selling counterfeits, the Transaction Clearing Center sends a prompt such as "the product unit you scanned is suspected of being counterfeit, there is a prize for reporting it" directly to the buyer, who can upload counterfeiting clues under the guidance of the Transaction Clearing Center.

If Distributor X is even more bold and daring, even the box and its QR code are counterfeited. After Buyer F scans the QR code on the exterior of the box, the following three scenarios occur:

Scenario 1: the QR code marked on the exterior of the box is a copy of the QR code marked on one of the 5 boxes of Moutai Liquor sold by Distributor X to Retail Store B. In this Scenario, the Buyer F, who is the opposite of Distributor X, is unable to scan the authentication message sent by the Transaction Clearing Center to Retail Store B, the last buyer of the (original) box of (authentic) Moutai Liquor, so that the seller in the current transaction (Distributor X) is not the buyer in the previous transaction (Retail Store B) and is suspected of selling counterfeits. Therefore, the transaction is terminated.

Scenario 2: the QR code on the exterior of the box is made up out of thin air. In this Scenario, the Transaction Clearing Center finds that the QR code does not correspond to any independently tradable product unit, so it sends a prompt such as "the product unit you scanned is suspected of being counterfeit, there is a prize for reporting it" to the Buyer F, and the transaction is terminated.

Scenario 3: the QR code marked on the exterior of the box is a copy of the QR code marked on the exterior of an unsold one among the 100 boxes of Moutai Liquor bought by Distributor X. In this Scenario, after Buyer F, who is the opposite of Distributor X, scans the authentication message sent by the Transaction Clearing Center to Distributor X, the last buyer of the (original) box of (authentic) Moutai Liquor, the Transaction Clearing Center determines that the seller in the current transaction (Distributor X) is the buyer in the previous transaction (Distributor X), and then starts the payment procedure, allowing the (replicated) box of (counterfeit) Moutai Liquor to be successfully traded. However, at the same time, the original box of authentic Moutai Liquor, which has not yet been sold, becomes a "counterfeit". Once Distributor X attempts to sell the (original) box of (authentic) Moutai Liquor (or the second replicated box of counterfeit Moutai Liquor) to Buyer G, who, as opposed to Dealer X, is unable to scan the authentication message sent by the Transaction Clearing Center to Buyer F, the last buyer of the (replicated) box of (counterfeit) Moutai Liquor, so that not only the (original) box of (authentic) Moutai Liquor (or the second replicated box of counterfeit Moutai Liquor) cannot be sold, but also the sale of the (replicated) box of (counterfeit) Moutai Liquor by Distributor X to Buyer F may be revealed.

It can be seen that at most, a dealer can sell a counterfeit product in place of an authentic one, but at the same time the authentic product becomes a "counterfeit" and cannot be sold.

Effect 3: prevention of phishing with the help of the manufacturer's Settlement Account dedicated to receive and transfer transaction payments:

A buyer, who uses a Scanning Device to scan the QR code on the exterior of a product unit in order to initiate a transaction, may be deceived and misled by phishing, so that his or her Scanning Device is not connected with the authentic Transaction Clearing Center of Moutai Company. As a result, none of the steps described above can be carried out. Fortunately, the Settlement Account of Moutai Company, which is dedicated to receiving and transferring transaction payments, can be used to prevent phishing and protect the buyer from being deceived.

For this purpose, Moutai Company widely advertises a message such as "you can only buy authentic Moutai Liquor if you pay for it directly to the account XXXXXX of Moutai Company", e.g., near the QR code on the exterior of each Moutai Liquor unit of different sizes, and even through various media. When Moutai Liquor is bought by means of remote communication such as the Internet, the above-mentioned widely advertised message is specifically communicated to the orderer, recipient and payer during the ordering process, as well as before and after the order is accepted and even during the order confirmation. When the above-mentioned widely advertised message is displayed online, a link to the official website of Moutai Company or a link to a page about Moutai Company in an authoritative information system such as the "National Enterprise Credit Information Publicity System" is embedded for viewers to click at any time to read and verify the relevant information.

After a buyer uses a Scanning Device to scan the QR code marked on the exterior of a Moutai Liquor unit, if no content is displayed on the device, it means that the QR code is incorrect. If the content displayed on the device does not contain Moutai Company; or if the content contains Moutai Company but without link embedded for clicking; or if after clicking, the official website of Moutai Company or the page about Moutai Company in an authoritative information system such as the "National Enterprise Credit Information Publicity System" is not displayed; or if the website or page is displayed (including but not limited to the manufacturer's name "Moutai Company", unified social credit code "9152000071430580XT", registered residence "Moutai Town, Zunyi City, Guizhou Province, China", business scope "Production and Sales of Moutai Liquor Series Products", domain "www.moutaichina.com") but a message such as "you can only buy authentic Moutai Liquor if you pay for it directly to the account XXXXXX of Moutai Company" is not displayed after clicking on the official website address; or if the message is displayed but the Settlement Account XXXXXX of Moutai Company displayed near the QR code on the exterior of a Moutai Liquor unit or even advertised widely is inconsistent with that shown on its official website, the QR code is counterfeit. Whether the QR code is incorrect or counterfeit, the Moutai Liquor unit is suspected to be counterfeit and therefore cannot be traded through the Transaction Settlement System of Moutai Company, because the buyer's Scanning Device is not connected with the authentic Transaction Clearing Center of Moutai Company. In such a situation, the buyer will need to search the authentic Transaction Clearing Center of Moutai Company using a search engine and establish a communication connection with it in order to be guided by its prompts to upload the counterfeiting clues.

To sum up, after implementing the method of the present invention, the only way to sell a bottle of counterfeit Moutai Liquor is for a dealer to drink a bottle of authentic Moutai Liquor himself, and then fill non-Moutai liquor into the original Moutai bottle, seal the bottle and pack it in the original package; or by filling non-Moutai liquor into a replicated Moutai bottle, sealing the filled bottle, packing it in a replicated package, and placing a replicated identity code on the exterior of each of the replicated bottle and package, the replicated bottle of counterfeit Moutai Liquor can be sold in place of the authentic one, which can then be kept for the dealer's own enjoyment only, because once the dealer attempts to sell the original bottle of authentic Moutai Liquor or the second replicated bottle of counterfeit Moutai Liquor with the same identity code, not only the sale cannot take place, but also the sold replicated bottle of counterfeit Moutai Liquor may be revealed. Therefore, the largest scale of counterfeit Moutai Liquor is reduced to the amount sold by dealers who use replicated identity codes on the exterior of counterfeit Moutai Liquor units to replace authentic ones for their own enjoyment. Compared to the current scale of counterfeit Moutai Liquor and the extent of the damage it causes, these are few and far between cases with minimal impact.

In addition, the Settlement Account held by Moutai Company for receiving and transferring transaction payments enables that payments no longer flow from a buyer to the manufacturer via a dealer, but from a buyer to a dealer via the manufacturer, so that even if a dealer sells counterfeits, there is no revenue to be generated for the dealer; the Settlement Account also protects against phishing and prevents buyers from being defrauded.

The method proposed in the present invention is applicable to various transaction scenarios, such as offline or online. When buying a product unit remotely through communication means such as the Internet, if payment has been made prior to the arrival of the unit, the QR code on the exterior of the unit can be scanned upon receipt of the unit, repeating the steps previously completed in an online manner to determinate whether the seller has the right to sell; if payment is taken on delivery, the payment step needs to be completed in addition to this.

The method proposed in the present invention overturns centuries-old business rules and methods, especially changes the flow of payments, making counterfeiting unprofitable and selling counterfeits without a way out; on the other hand, with the popularity of mobile terminal devices such as smartphones and QR codes and electronic payments, the method is extremely simple to implement and compatible with all current transaction scenarios without making significant changes to existing transaction habits, so it is very easy to popularize its application.

In short, the method proposed in the present invention can simply and effectively exclude the majority of counterfeit products from the transaction process of authentic products, so that every buyer can easily buy authentic products without having to identify them. This new business model, which is both in line with traditional trading habits and of unique inventiveness, is not only economically feasible and effective in intercepting counterfeits from the market without the need to identify them, but also largely renders anti-counterfeiting methods, which are becoming increasingly technical and costly, increasingly difficult for consumers to grasp and use and increasingly reluctant to cooperate, and therefore less and less effective in combating counterfeiting, redundant.

What is claimed is:

1. A Tracking Management Method for Commodity Circulation Information, implemented by means of a Transaction Settlement System having a Product Database, Scanning Devices, and a Transaction Clearing Center, the Tracking Management Method comprising:

(1) marking an identity code on a product unit; writing product unit information into the Product Database;

(2) prompting a buyer to scan the identity code on the product unit using a buyer's Scanning Device connected to the Transaction Clearing Center via a network; scanning, using the buyer's Scanning Device, the identity code on the product unit such that the buyer's Scanning Device uploads an ID of the buyer's Scanning Device and a first scanning result to the Transaction Clearing Center and initiates a current transaction;

(3) determining, with the Transaction Clearing Center, that a seller of the product unit in the current transaction is a last buyer of the product unit in a previous transaction, wherein this step (3) comprises:

① reading, at the Transaction Clearing Center and based on the first scanning result, a record of the previous transaction using the product unit information obtained from the Product Database; sending, from the Transaction Clearing Center and based on the record of the previous transaction, an authentication message to a last buyer's Scanning Device; and ② prompting the buyer to, using the buyer's Scanning Device, scan the authentication message on the last buyer's Scanning Device; displaying, on the last buyer's Scanning Device, the authentication message; scanning, using the buyer's Scanning Device, the authentication message on the last buyer's Scanning Device such that the buyer's Scanning Device uploads a second scanning result to the Transaction Clearing Center; determining, based on the second scanning result, that the seller is the last buyer;

(4) transferring payment for the product unit from the buyer based on the determination; and (5) entering a record of the current transaction into the Product Database, wherein the record of the current transaction includes the identity code of the product unit, and the ID of the buyer's Scanning Device.

2. The Tracking Management Method according to claim 1, wherein:

the Transaction Settlement System further includes:

a Settlement Account dedicated by a manufacturer to receive and transfer payments for a plurality of transactions of a plurality of product units of the manufacturer; and a Transaction Settlement Software; and in step (4), transferring the payment for the product unit from the buyer comprises:

receiving, at the Settlement Account, the payment; and transferring, by the Transaction Settlement Software, the payment to the seller.

3. The Tracking Management Method according to claim 2, wherein each product unit of the plurality of product units corresponds to, and is marked with, a unique identity code.

4. The Tracking Management Method according to claim 1, wherein step (3) further comprises:

prompting the seller to, using a seller's Scanning Device, scan the identity code to upload an ID of the seller's Scanning Device and a third scanning result to the Transaction Clearing Center; and determining, at the Transaction Clearing Center and using the record of the previous transaction, that the ID of the seller's Scanning Device matches an ID of the last buyer's Scanning Device.

5. The Tracking Management Method according to claim 1, wherein:

the Transaction Settlement System further comprises a Dealer Database including:

dealers authorized or registered by a manufacturer as being qualified to sell products of the manufacturer; and Scanning Device IDs of the dealers; and step (3) further comprises determining, by searching the Dealer Database with an ID of the last buyer's Scanning Device, that the buyer of the product unit in the previous transaction is a dealer authorized or registered by the manufacturer as being qualified to sell the product unit.

6. The Tracking Management Method according to claim 2, wherein step (4) further comprises:

generating, at the Transaction Clearing Center, a transaction statement for the buyer; and upon receipt of the payment at the Settlement Account, executing, with the Transaction Clearing Center, the Transaction Settlement Software to transfer the payment to the seller in accordance with the transaction statement.

7. The Tracking Management Method according to claim 1, wherein the record of the current transaction further includes:

a unit price, a quantity, a total amount, a time, a place, and a manner of the current transaction;

a name of the buyer and a name of the seller;

a Settlement Account number of the buyer and a Settlement Account number of the seller; and a location of the buyer's Scanning Device.

8. The Tracking Management Method according to claim 1, wherein the identity code comprises: a bar code, a QR code, and/or an RFID.

* * * * *